Aug. 8, 1967   R. J. NEY   3,335,310
ELECTRON IMAGE TUBE FIBER OPTICAL FACE PLATE SEAL STRUCTURE
Filed June 12, 1964

INVENTOR:
ROBERT J. NEY,
BY James J. Lichiello
HIS ATTORNEY.

3,335,310
ELECTRON IMAGE TUBE FIBER OPTICAL FACE PLATE SEAL STRUCTURE
Robert J. Ney, Liverpool, N.Y., assignor to General Electric Company, a corporation of New York
Filed June 12, 1964, Ser. No. 374,643
5 Claims. (Cl. 313—89)

This invention relates to an improved seal structure and more particularly to an improved sealing structure including a stress accommodating intermediary metallic support between two non-metallic members.

Television camera tubes are ordinarily subjected to very stringent operating conditions with respect to thermal stresses and vibrational shocks which deleteriously affect their optimum operative life cycle. Therefore, great care must be taken to provide effective structural interrelationship of the integral parts including the sealing or bonding means employed for the attachment of various members in such tubes. Particularly, a high degree of care is involved, and considerable criticality attached to, the sealing or joining means which are employed to join the camera tube optical face plate to the tube body. The face plate is ordinarily an optical member such as various known optical glasses, sapphire, etc. However, there is a marked difference in the thermal coefficients of expansion between the mentioned materials and the hard glass of the tube body leading to serious sealing problems at their juncture. It has also been proposed to employ a fiber optics face plate for television camera tubes because a fiber optics face plate is superior to the former optical glass face plate for some applications. However, together with the considerable difference in thermal expansion of a fiber optic element and the glass body of the camera tube, the internal bond of a fiber optic plate is not of high strength, a feature which also introduces a serious problem of sealing the face plate to the tube body.

Accordingly, it is an object of this invention to provide an improved seal.

It is a further object of this invention to provide an improved glass or ceramic-to-metal seal.

It is a still further object of this invention to provide a combined sealing method and apparatus for the joining of a television camera tube face plate to the tube body.

It is yet another object of this invention to provide an improved supporting means and sealing assembly for a fiber optics face plate for camera tubes for the joining thereof to a glass tube body.

It is another object of this invention to provide an improved sealing and intermediate metallic supporting means for the joining of a face plate to a camera tube body.

It is yet another object of this invention to provide a bi-metallic intermediate sealing and supporting means between the optical face plate and glass body of an image orthicon camera tube.

Briefly described, this invention in one form includes an annular frame or flange supporting member on which there is concentrically positioned an improved optical face plate. This frame member is convoluted, dished or is otherwise concave or convex from the periphery toward a central opening defined by a very thin central shelf. The shelf supports the optical face plate in sealed relationship. At the same time, this frame member is concentrically positioned within and joined at its periphery to a thin metal cylinder. The other edge of the cylinder is joined concentrically with the rim of a mating, abutting, hard-glass tube body.

This invention will be better understood when taken in connection with the following description and drawings in which FIG. 1 is a cross-sectional illustration of a portion of an image orthicon tube illustrating the face plate attaching means of this invention.

Without references to the numerous kinds of face plate materials, and the particular kinds of sealing materials (brazes, solders, etc.) employed, it is a common problem that in all instances the sealing means or attaching arrangement must provide for high thermal stresses and shock stability and maintain effective face plate alignment and spacings under adverse operating conditions. One of the most contributing factors to face plate seal failures and other types of failures is the thermal mismatch condition between the face plate material and the tube body. In order to more effectively utilize known seal materials in critical applications, additional structure means must be provided to relieve stresses.

Figure 1:
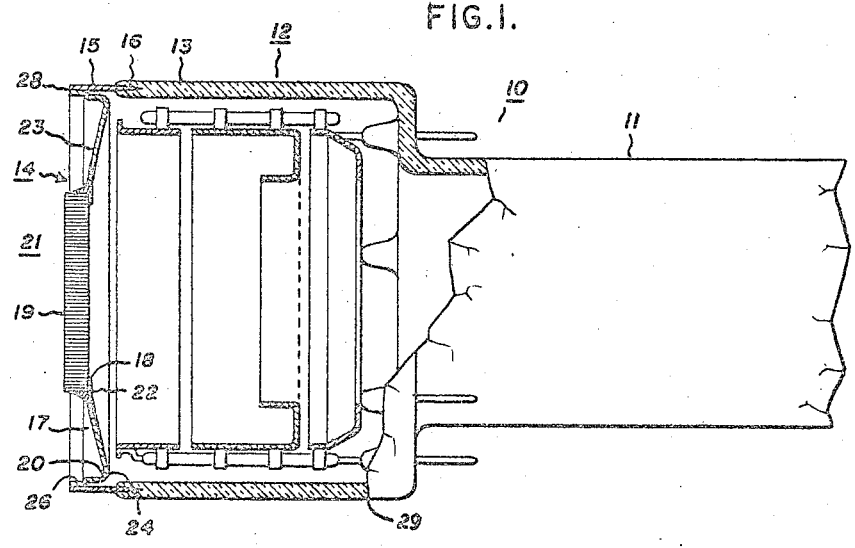

This invention is more particularly related to image orthicon pickup tubes as illustrated in FIG. 1 where the tube configuration 10 includes a cylindrical glass body 11, usually of a borosilicate glass. The face plate and target section 12 of the image orthicon tube 10 generally includes a cylindrical or tubular hard glass section 13 to which a face plate assembly 14 is attached. It has been discovered that when attempting to join face plates made of such materials as different glasses, fiber glass, sapphire, and other such ceramics, to the hard-glass body 11, the heretofore mentioned problems of misalignment, stability, and good seals quickly arise. It has been discovered that effective sealing and attaching means which overcome the mentioned problems may be provided through the use of a particularly formed bi-metallic member.

One specific feature of a bi-metallic member relates to the use of predetermined metallic elements as the intermediary member for sealing one ceramic material, i.e., the face plate, to the tube glass body. For example, the bi-metallic member includes one particular metal which is joined or otherwise sealed to the face plate, and which is so chosen as to provide not only a proper seal to the face plate but also be closely approximate the coefficient of expansion of the face plate itself. The other metal of th bi-metal element is chosen for joining to the hard-glass tube body and this metal is also so chosen as to provide not only the proper seal but also a close approximation of the thermal expansion characteristics of the tube glass body. Finally, a particular joining means, such as welding, is then adapted to join the chosen metal elements at an intermediate position where the difference of expansion characteristics may be better tolerated than at either the face material or the glass body. One example of this invention is illustrated in FIG. 1 by the sealing arrangement 14. The sealing arrangement 14 includes a thin metal annulus, or cylinder 15, which is concentrically positioned on the end of the glass section 13 and abuts thereto. More particularly, one edge of cylinder 15, which is illustrated as 16, is embedded within the glass wall material of section 13. The particular sealing means which is employed to join the edge 16 to the glass wall 13 may take the form of those well known prior art glass-to-metal seals where end 16 is embedded in the glass tube 13 by heat softening the glass.

The face plate portion of the arrangement 14 includes a suitable thin metal flange or frame member 17 providing a concentric opening 18, over which the face plate 19 is attached. It has been discovered that optimum results are only obtained in the practice of this invention when the flange member 17 is suitably convoluted so that a major portion of the frame member 17 and face plate 19 does not lie in common plane transverse to and perpendicular to the longitudinal axis of tube 10. The described arrangement is therefore one in which the frame 17 is convex or protrudes outwardly from tube 11. However, frame member 17 may also be concave inwardly for other applications, for example, where a thicker face plate is employed.

Figure 2:
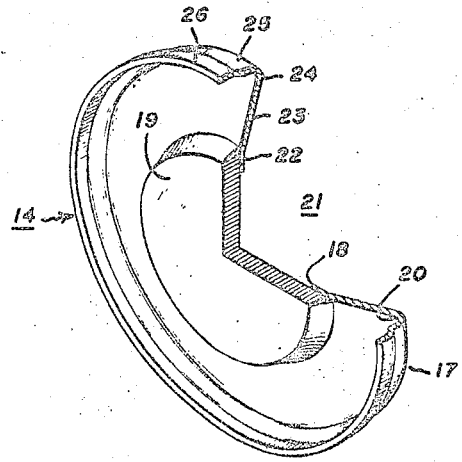
FIG. 2 is an isometric and partial cross-sectional view of the face plate mounting assembly of this invention.

As best illustrated in FIG. 2, the convoluted frame member 17 and the face plate 19 constitute an intermediate assembly 21 which may be thereafter joined as a unit to section 13. The frame member 17 includes an annular radially inwardly directed shoulder or shelf surface 22, defining opening 18, which is arranged to lie parallel and coextensive with the face plate 19 for sealing thereto. From the shoulder surface 22, frame member 17 includes a gradually sloping or tapering portion 23 which tapers radially outwardly at least about half the distance between the face plate and the outer periphery of frame member 17. Frame member 17 then includes a short arcuate section 24 adjacent the tapered portion 23, followed by a cylindrical portion 25 and a ridge or rim portion 26. The convolution or a corrugation 20 which is defined in part by arcuate section 24, but which also includes sides 25 and 23, is denoted as a large convolution which provides the necessary flexibility through the resiliency of the structure. As an operative example, the depth of the convolution from the outer edge of rim 26 to the base of arc section 24 may be about 0.2 inch while the distance from the outer periphery of frame 17 to the beginning of shelf surface 22 may be about 0.25 inch. It is an important feature of this invention that frame member 17 be arcuate or include one or more convolutions such as described, whether the convolution is as illustrated in FIG. 2 or the reverse thereof to be convex exteriorally of the tube.

The preferred arrangement as illustrated provides a high degree of flexibility to the face plate to maintain the face plate in its desired critical position under atmospheric pressure and during adverse operating conditions. The face plate 19 is joined to surface 22 through various sealing means well known in the art. In the practice of this invention, glass frit type seals have been used to good advantage. Other seals may also be employed. For example, a brazing process may be employed which includes a brazing material comprising such combined materials as indium, copper, and silver, together with titanium hydride with a brazing temperature of about 800° C. Other brazing materials such as various high temperature solders and brazes may also be employed for this purpose.

Figure 3:
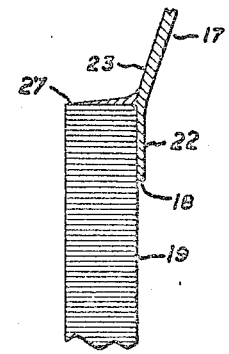
FIG. 3 is a partial cross-sectional illustration of the mounting flange of this invention.

Optimum performance is obtained in the practice of this invention when a particular shoulder 22 configuration is employed in the assembly of the face plate 19 to the flange member 17. For example, referring now to FIG. 3, there is shown a partial view of a joining arrangement between face plate 19 and the flange member 17. The shoulder portion 22 has been reduced in thickness considerably, compared with the thickness of the tapered portion 23. For example, by comparison, the tapered portion 23 may be on the order of 0.025 inch thickness, while the thickness of the reduced flange 22 is about 0.006 inch or less. Shoulder thicknesses substantially in excess of about 0.005 inch lead to frequent seal failures. The reduced section provides a stress accommodating means for the seal structure, impedes heat transfer to the face plate, and generally ameliorates the differences in coefficient of expansion of the two members.

The outer periphery of face plate 19 is positioned next adjacent tapered surface 17 or sufficiently close so that the seal material 27 tapers or fills the corner defined by the periphery of face plate 19 and surface 22 at the juncture of the thicker portion 17. Ordinarily there is little if any significant exposure of thin surface 22 between face plate 19 and tapered section 17.

The kinds of sealing materials and methods which are to be employed, with respect to their required temperatures, may govern the order of assembly of tube 10. One preferred arrangement is to arc weld frame 17 to cylinder 15 at juncture 28. Thereafter end 16 of cylinder 15 is coated or covered with molten glass to provide a short glass cylinder. This short glass cylinder is then attached to a longer glass cylinder by melting and joining adjacent ends. The longer glass cylinder constitutes most of tube section 13. At this point, the face plate 19 is attached to frame 17. Thereafter, the longer glass cylinder is joined, by melt softening, to tube body 10 at the base 29 of FIG. 1.

This invention has been employed with excellent results in the construction of image orthicon tubes utilizing face plates of such materials as fiber optics, glass, sapphire, and other ceramics generally. A fiber optic face plate is usually manufactured from a great number of small glass rods lying in contiguous and adjacent parallelism. The image surfaces of a fiber optic face plate are those front and back surfaces which are transverse to the longitudinal axis of the individual rods. Such a fiber optic face plate is a highly desirable item as a face plate for image orthicon tubes in special low light level applications. However, the thermal expansion for the fiber optical element is about $89 \times 10^{-7}/°$ C., while that for hard glass is about $46 \times 10^{-7}/°$ C. For proper glass sealing, a difference of not more than about 3% is required. In addition to the high degree of difference in coefficients of expansion, the internal bond between the individual glass rods in the fiber optical disk is poor to the extent that a relatively flexible joint is also required between the fiber optic face plate and the tube bulb so that the fiber bundles are not actually pulled apart by the face plate seal. Successful fiber optic seals have been manufactured in accordance with the practice of this invention as illustrated and described in FIG. 1. For example, the cylindrical sleeve 15 was Fernico, while flange member 17 was of a nickel iron alloy (52% nickel, balance iron) and 0.020 inch thick. The surface 21 was thinned to about 0.003 inch and the rim 25 was arc welded. One of the primary advantages of this configuration is that it does not deflect significantly under atmospheric pressure loading. The convex section as illustrated in FIG. 1 is preferred over the reverse or concave configuration since a thinner piece of fiber optics is required to bring the optical face plate to or above the outside flange line. The radius of curvature of section 23 was about 0.062 inch.

While various combinations of materials may be employed in the practice of this invention, the preferred combination should include metals which have thermal coefficients of expansion within about 3% to that of the respective ceramic member. At the same time, the very thin supporting surface for the face plates should be about 0.006 inch or less.

While a specific method and apparatus in accordance with preferred teachings of this invention have been described and illustrated, it is not desired that this invention be limited to the particular form shown on the method described and it is intended by the appended claims to cover all modifications within the spirit and scope of this invention.

I claim:
1. In a face plate arrangement for an electron image tube, the combination comprising
 (a) a thin annular metal member having a large concentric annular depression axially therein surrounding an aperture,
 (b) said metal member having a reduced thickness radially inwardly directed annular supporting surface adjacent said depression and defining said aperture,
 (c) a fiber optical face plate member overlapping said aperture and concentrically sealed to said supporting surface for flexible support thereby with said support surface parallel to said plate,

(d) said metal member and said ceramic member having predetermined and close coefficients of expansion,
(e) a metal support ring surrounding said metal number and peripherally joined thereto,
(f) said metal support ring having a significantly different coefficient of expansion than said annular metal member and said ceramic disk member,
(g) said metal support ring having a coefficient of expansion closely approximating that of a further support to which it is adapted to be sealed.

2. An electron image tube having a face plate section comprising
(a) a thin annular metal member,
(b) said member having a large annular convolution therein,
(c) said metal member having a reduced thickness annular supporting surface adjacent said convolution and defining a central aperture,
(d) said annular supporting surface having a reduced thickness in the range from about 0.003 to about 0.006 inch,
(e) a fiber optic face plate member overlapping said aperture and concentrically sealed to said annular supporting surface for flexible support thereby with said supporting surface parallel to the face plane of said face plate,
(f) said annular metal member and said ceramic member having predetermined and close coefficients of expansion,
(g) a cylindrical metal support ring coaxially surrounding said annular metal member and peripherally joined thereto at one edge,
(h) said metal support ring having a significantly different coefficient of expansion than said annular metal member and said fiber optic face plate,
(i) said metal support ring having a coefficient of expansion closely approximating that of a further support to which it is adapted to be sealed.

3. An electron image tube apparatus having a tube section and a target section, said target section comprising in combination
(a) an annular metal alloy member of from about 0.015 to 0.020 inch thickness having an annular large convolution therein,
(b) said metal member having a reduced thickness radially inwardly extending annular supporting surface adjacent said convolution and defining a central aperture,
(c) said annular supporting surface having a reduced thickness in the range from about 0.003 to about 0.006 inch,
(d) a fiber optic face plate member of a diameter larger than said aperture and concentrically sealed to said supporting surface for flexible support thereby,
(e) a different metal alloy support ring surrounding said annular metal member and peripherally joined thereto,
(f) said metal support ring having a significantly different coefficient of expansion than said annular metal member,
(g) and a glass cylinder adapted for coaxially sealing to said support ring in edge abutting relationship,
(h) said metal support ring having a coefficient of expansion closely aproximating that of said glass cylinder.

4. An image orthicon camera tube having a tube section and a target section, said target section comprising in combination
(a) an annular metal alloy member of from about 0.015 to about 0.020 inch thickness, having a concentric convolution therein,
(b) said metal alloy including at least one metal taken from the group consisting of iron, nickel, chromium, titanium,
(c) said metal alloy member having an axially depressed reduced thickness radially inwardly extending annular supporting surface defining a central aperture,
(d) said annular supporting surface having a reduced thickness in the range of about 0.003 to about 0.006 inch,
(e) a fiber optic face plate member of a larger diameter than said aperture and concentrically sealed to said supporting surface for flexible support thereby with the outside diameter of said supporting surface being slightly radially larger than said face plate to have a seal material cover the exposed juncture, said face plate having a constant thickness over the diameter thereof,
(f) said metal alloy member and said ceramic member having predetermined and close coefficients of expansion,
(g) an annular different metal alloy supporting ring surrounding said metal alloy member and peripherally joined thereto,
(h) said metal alloy supporting ring having a significantly different coefficient of expansion than said annular metal alloy member and said fiber optic face plate,
(i) and a glass cylinder concentrically sealed to said supporting ring,
(j) said metal support ring having a coefficient of expansion closely approximating that of said glass cylinder to which it is sealed.

5. A method of assembling a face plate arrangement to a tube body which comprises
(a) providing an annular metal member adapted to sealingly support an optical face plate,
(b) welding said annular metal member concentrically with a cylindrical metal member,
(c) forming a glass bead on the exposed edge of said cylindrical member,
(d) concentrically attaching a glass cylinder to said bead, and
(e) sealing said face plate to said annular member,
(f) sealing said glass cylinder concentrically to a camera tube body.

References Cited
UNITED STATES PATENTS

| | | | |
|---|---|---|---|
| 1,964,952 | 7/1934 | Klinckmann | 189—36.5 |
| 2,584,653 | 2/1952 | Alpert | 189—36.5 |
| 2,647,070 | 7/1953 | Litton | 287—189 |
| 2,708,250 | 5/1955 | Day | 313—282 |
| 2,873,397 | 2/1959 | Gray | 313—89 |
| 3,213,308 | 10/1965 | Feibelman | 313—89 |
| 3,244,921 | 4/1966 | Behun | 313—89 |

JAMES W. LAWRENCE, *Primary Examiner.*
R. JUDD, *Assistant Examiner.*